F. C. SCHOFIELD.
DUMPING VEHICLE.
APPLICATION FILED FEB. 17, 1919.
1,351,796.
Patented Sept. 7, 1920.
3 SHEETS—SHEET 3.
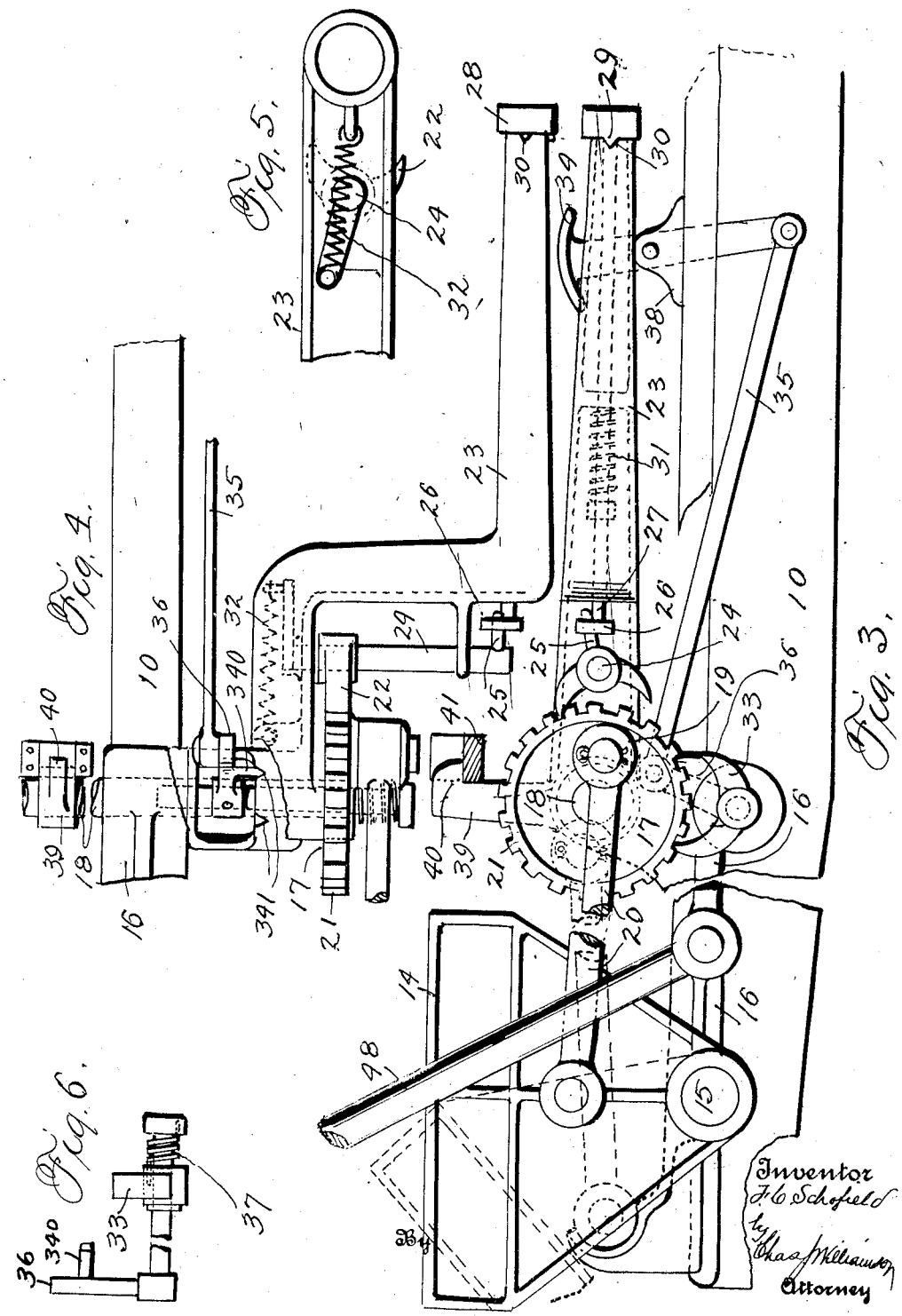

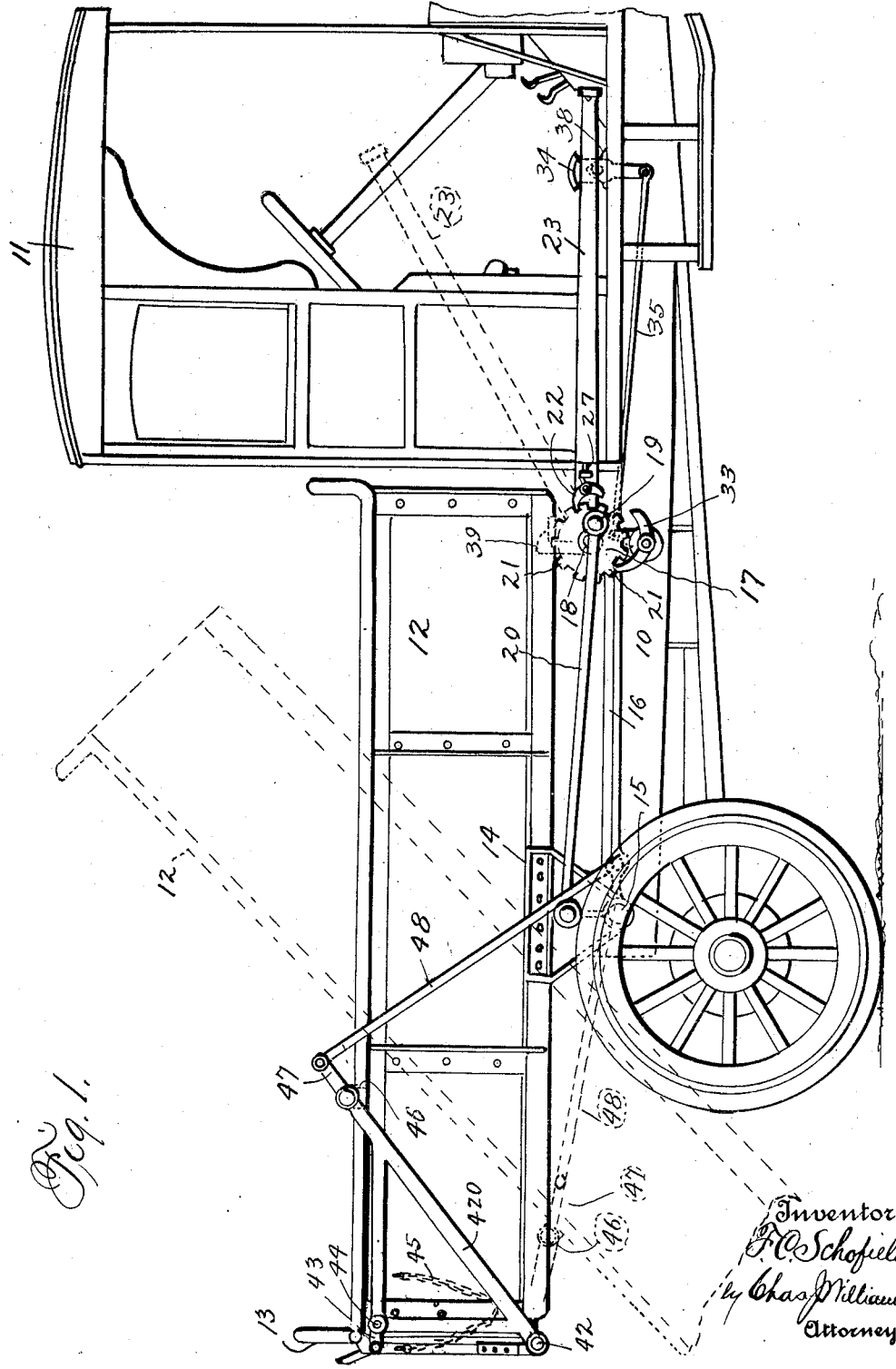

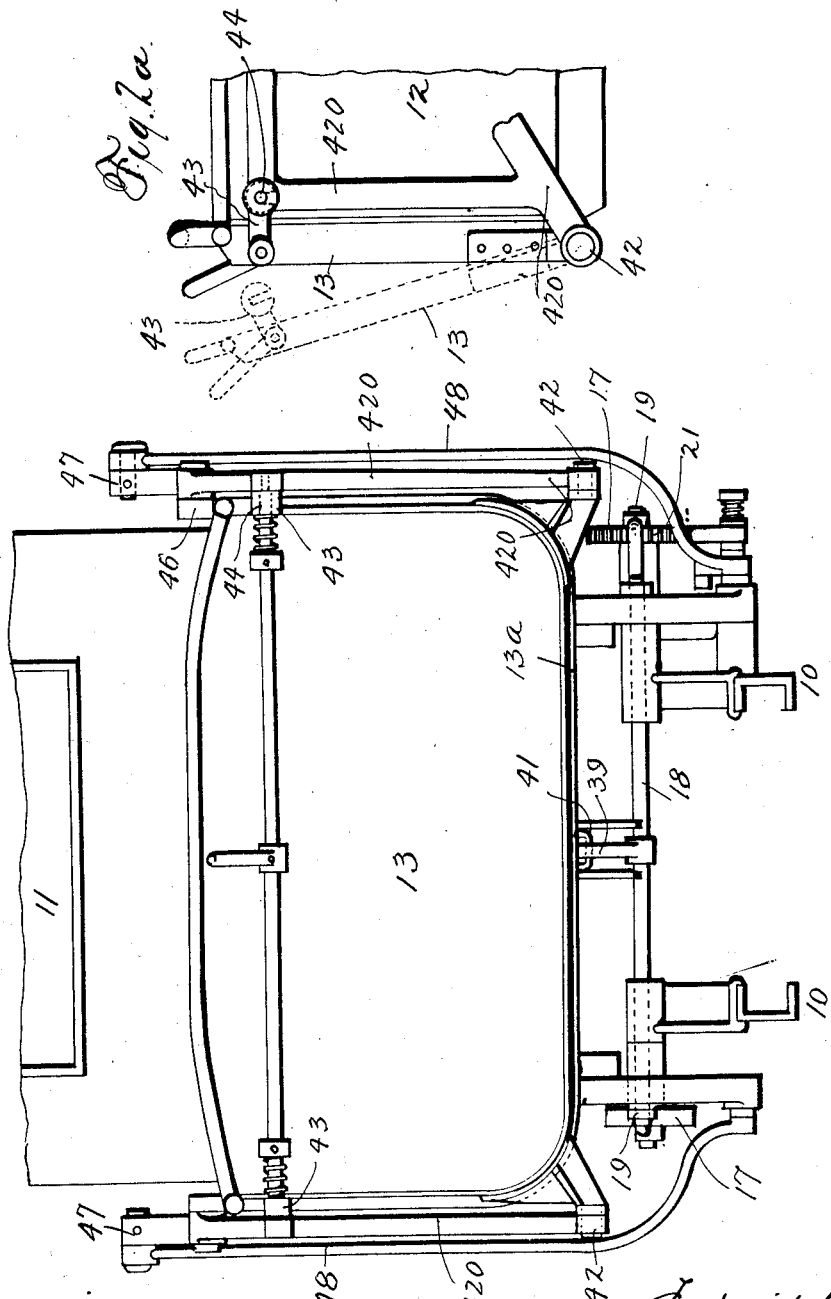

UNITED STATES PATENT OFFICE.

FREDERICK C. SCHOFIELD, OF SALEM, VIRGINIA, ASSIGNOR, BY DIRECT AND MESNE ASSIGNMENTS, TO THE HILLFIELD BODY COMPANY, OF SALEM, VIRGINIA, A CORPORATION OF VIRGINIA.

DUMPING-VEHICLE.

1,351,796.   Specification of Letters Patent.   Patented Sept. 7, 1920.

Application filed February 17, 1919. Serial No. 277,669.

*To all whom it may concern:*

Be it known that I, FREDERICK C. SCHOFIELD, of Salem, in the county of Roanoke and State of Virginia, have invented certain new and useful Improvements in Dumping-Vehicles, and do hereby declare that the following is a full, clear, and exact description thereof.

The object of my invention, generally stated is to provide means for operating the bodies of automobile trucks and other vehicles, which will require a minimum of effort on the part of the operator to move the body, and expose him to no danger of injury, and which will together with the body, be capable of complete construction for easy and inexpensive application to trucks which, as made and sold, are not already equipped with dumping bodies and, for the attainment of this object and to secure other advantages not necessary to be pointed out, my invention consists in the construction substantially as hereinafter specified and claimed.

In the annexed drawings:—

Figure 1 is a side elevation of an automobile truck embodying my invention;

Fig. 2 is a rear elevation;

Fig. 2ª is a detail side view of the tail gate.

Fig. 3 is a detail view in side elevation of the operating mechanism;

Fig. 4 is a top plan view thereof;

Fig. 5 is a detail view of the reversible feed pawl;

Fig. 6 is a detail view of the reversible stop dog or detent.

Inasmuch as I have had especially in view the application of my invention to an automobile truck (while not limiting it thereto) I show in the drawing a well-known type, it having a chassis 10 and a driver's cab 11, mounted only on the forward part of the chassis leaving abundant support in rear of the cab for a body 12 of usual general form, with a tail gate 13, and made conveniently of sheet metal and angle iron. At each side, and substantially at mid-length, the body has a downwardly extending bracket 14, which at its lower extremity has a pivotal connection 15, with a bar 16, preferably a casting, that is bolted to the side bar of the chassis, and thus the body is pivotally mounted upon the latter. The pivot is located a considerable distance below the body bottom so that the body when swung from its horizontal position, at once moves bodily rearward, taking it from the cab immediately, and causing it to promptly clear the rear end of the chassis. The body when in a horizontal position, can thus be close to the rear of the cab, wasting no room, and yet danger of collision with the cab does not exist.

At the forward end of one of the castings 16, on each side of the truck, is a crank disk 17, fixed to a cross shaft 18 journaled in bearings on the two castings 16, and from the wrist pin 19 of said disk, a pitman 20 extends to and is pivotally connected with the bracket 14 on the same side of the truck. One disk has peripheral teeth 21 for engagement by a pawl 22 carried by a lever 23 which normally extends horizontally close to the floor of the cab with its forward end in convenient position to be grasped by the driver and swung upward. As soon as the center of gravity of the loaded body passes in rear of the body pivot, (which happens with a comparatively short movement of the operating lever) no further effort by the operator is required of the operator, for the remainder of the tilting motion of the body is done by gravity, and the operator is exposed to no danger from the lever when the body thus moves by gravity because the ratchet connection between the lever and the crank disk permits the latter to "run away" from the lever. The pawl 22 is double and reversible so that it may be used to rotate the crank disk in direction for dumping and for restoring the dumped body to horizontal position. It is mounted on a rock shaft 24 journaled in the lever 23 and near one end said shaft has an arm 25 that is engaged by a lug 26 on a rod 27 that extends through and is swiveled in the lever 23 and at the handle end of the lever has a head 28 for turning the rod in either direction to shift the pawl. The head 28 has a V-shaped lug 29 that coacts with either of the two notches 30 in the lever end in yielding engagement with which it is held by a spring 31 in the lever that acts on the rod to move it longitudinally, and thus the pawl is held in either of its two working positions. A spring 32 connected at one end to a radial finger on the rock shaft 24 serves, in a well-known way, to yieldingly hold the pawl in engagement with the crank disk in whichever of its two positions the pawl is placed.

The teeth of the crank disk are also engaged by either tooth of a double detent dog 33, which likewise is pivoted and spring-held in either of its working positions, and which is shiftable to change its working position by a treadle 34 in the floor of the cab, which treadle is connected by a pitman 35 with a crank 36 connected by a spring 37 with the dog, such connection being through the shaft on which the crank is fixed, to a collar on which one end of the spring is secured, the other end of the spring engaging the dog. (See Fig. 6.) The treadle 34 is pivotally mounted in a bracket 38, a spring-held latch 340 and two coöperating notches 341 holds it in either position to which it is moved. Besides the lock which the dog 33 constitutes, I preferably mount the body on its pivot so that it is overbalanced forward of the pivot, and thus tends to remain in horizontal position, and I provide a third holding means that consists of a finger 39 on the cross shaft 18 which at its free end has a hook 40 adapted to catch over a bar or plate 41 on the bottom of the body when the latter reaches its horizontal position. Lost motion to cause the latching and releasing of the finger without movement of the body is provided by having the latching and releasing motion take place during the vertical movement of the wrist pin 19 that imparts no appreciable longitudinal movement to the pitman 20 and hence no appreciable up and down movement to the body.

The tail gate 13 is opened and closed automatically by the swinging of the body and it is also adapted to be opened and closed at will. As shown it consists of a plate or plates of sheet metal riveted at the bottom and sides to an angle iron 13ª, and at each lower corner it has a pivot 42 in the lower angle of a triangular frame 420. The tail gate may be swung at will upon its pivots 42, when a swinging latch bar 43 that engages a rod or pin 44 on said frame is disengaged from said pin. To limit the downward swing of the tail gate so as to make it serve as a prolongation of the body bottom, a cord or chain 45 may be used. The frame 420 is pivoted at its upper, forward angle to a lug 46 on the body side at its top and to a crank arm 47 at such upper angle is pivoted one end of a pitman 48 whose other end is pivoted to a side plate 16, which being stationary, it results that movement is thus imparted to the tail-gate carrying frame 420 and swinging the tail gate open or closed, according to the direction of swing of the body. By pivoting the tail gate to the body at the elevated point afforded by the described location of the pivoting lug 46, the tail gate, in opening, moves bodily outward from the body, wholly clear of material to be discharged from the body.

I claim:—

1. In a dumping vehicle, the combination of a chassis, a body, a driver's cab whose rear is forward of but close to the front of the body, a bracket at each side of the body extending downward below the bottom thereof and pivoted to the chassis at a fixed point, whereby the body has only a swinging motion, a rotary member situated forward of said pivot, an operative connection between one of said brackets and said member to swing the body on said pivot, means accessible to the driver in the cab, to rotate said member, driver-operated means to prevent the rotation of said member, a shaft on which said rotary member is mounted, extending transversely of and supported by the chassis beneath the body, a hook carried by said shaft and a part on the bottom of the body into and out of engagement with which said hook moves when the shaft is turned.

2. In a dumping vehicle, the combination of a chassis, a body, a bracket at each side of the body extending downward and pivoted below the body to the chassis at a fixed point, a rotary member forward of the bracket on one side of the vehicle, a pitman extending from said member to the bracket above the body pivot, a lever, a double reversible pawl to act on said rotary member, and carried by the lever, and a double reversible dog to engage said member.

In testimony, that I claim the foregoing, I have hereunto set my hand.

FREDERICK C. SCHOFIELD.